(12) United States Patent
Hiratomo et al.

(10) Patent No.: US 8,373,974 B2
(45) Date of Patent: Feb. 12, 2013

(54) ELECTRONIC DEVICE

(75) Inventors: Shinji Hiratomo, Tokyo (JP);
Toshikazu Shiroishi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 13/204,381

(22) Filed: Aug. 5, 2011

(65) Prior Publication Data

US 2012/0206883 A1 Aug. 16, 2012

(30) Foreign Application Priority Data

Feb. 14, 2011 (JP) ................................. 2011-029132

(51) Int. Cl.
*G06F 1/16* (2006.01)
(52) U.S. Cl. .................... 361/679.01; 349/58; 349/60
(58) Field of Classification Search ............. 361/679.01; 349/58
See application file for complete search history.

(56) References Cited

U.S. PATENT DOCUMENTS

| | | | |
|---|---|---|---|
| 5,666,172 A | 9/1997 | Ida et al. | |
| 6,125,029 A | 9/2000 | Sasaki et al. | |
| 6,464,195 B1 * | 10/2002 | Hildebrandt | 248/460 |
| 6,847,416 B2 * | 1/2005 | Lee et al. | 349/58 |
| 7,230,660 B2 * | 6/2007 | An | 349/58 |
| 7,327,430 B2 * | 2/2008 | Lee et al. | 349/150 |
| 7,570,317 B2 * | 8/2009 | Zhou et al. | 349/58 |
| 7,623,195 B2 * | 11/2009 | Park et al. | 349/58 |
| 7,771,105 B2 * | 8/2010 | Ha et al. | 362/630 |
| 7,787,070 B2 * | 8/2010 | Choi et al. | 349/58 |
| 7,843,526 B2 * | 11/2010 | Lee et al. | 349/58 |
| 7,891,857 B2 * | 2/2011 | Lee et al. | 362/630 |
| 7,898,612 B2 * | 3/2011 | Ota | 349/58 |
| 7,952,886 B2 * | 5/2011 | Mikami | 361/752 |
| 8,154,681 B2 * | 4/2012 | Yamaguchi et al. | 349/60 |
| 2003/0218700 A1 | 11/2003 | Tsukamoto | |
| 2006/0132946 A1 | 6/2006 | Kim et al. | |
| 2011/0310314 A1 * | 12/2011 | Shirasaka et al. | 348/836 |

FOREIGN PATENT DOCUMENTS

| | | |
|---|---|---|
| JP | 04-274391 | 9/1992 |
| JP | 09-005744 | 1/1997 |
| JP | 10-268976 | 10/1998 |
| JP | 2003-197017 | 7/2003 |
| JP | 2003-279935 | 10/2003 |
| JP | 2006-171696 | 6/2006 |
| JP | 2008-083982 | 4/2008 |

OTHER PUBLICATIONS

Japanese Patent Application No. 2011-029132, Notification of Rejection, mailed Oct. 11, 2011, (with English Translation).

* cited by examiner

*Primary Examiner* — Lisa Lea Edmonds
(74) *Attorney, Agent, or Firm* — Blakely, Sokoloff, Taylor & Zafman LLP

(57) ABSTRACT

According to one embodiment, an electronic device includes a display module, a first component, a second component, a reinforcing member, a wiring, and a supporting member. The display module includes a display screen. The first component includes a first wall and a first engagement portion. The second component includes a second wall located opposite the first wall with respect to the display module and a second engagement portion that engages with the first engagement portion. The reinforcing member is located between the display module and the first and second engagement portions and extends along at least part of the periphery of the display module. The wiring is located between the reinforcing member and the display module. The supporting member is provided to at least one of the first component and the second component and is located between the display module and the wiring to support the display module.

9 Claims, 8 Drawing Sheets

ELECTRONIC DEVICE

CROSS-REFERENCE TO RELATED APPLICATIONS

This application is based upon and claims the benefit of priority from Japanese Patent Application No. 2011-029132, filed Feb. 14, 2011, the entire contents of which are incorporated herein by reference.

FIELD

Embodiments described herein relate generally to an electronic device.

BACKGROUND

There have been known electronic devices having a housing formed of a combination of a part including a back wall and a part including a front wall. The housing houses therein a reinforcing member as well as wiring that is routed around a display module.

This type of electronic device is required to reduce damage to the wiring.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a display module, a first component, a second component, a reinforcing member, a wiring, and a supporting member. The display module comprises a display screen. The first component comprises a first wall located opposite the display screen with respect to the display module and a first engagement portion located in a direction crossing a direction perpendicular to the display screen. The second component comprises a second wall located opposite the first wall with respect to the display module and a second engagement portion configured to engage with the first engagement portion. The reinforcing member is located between the display module and the first engagement portion as well as the second engagement portion, and extends along at least part of the periphery of the display module. The wiring is located between the reinforcing member and the display module. The supporting member is provided to at least one of the first component and the second component and is located between the display module and the wiring to support the display module.

Figure 1:
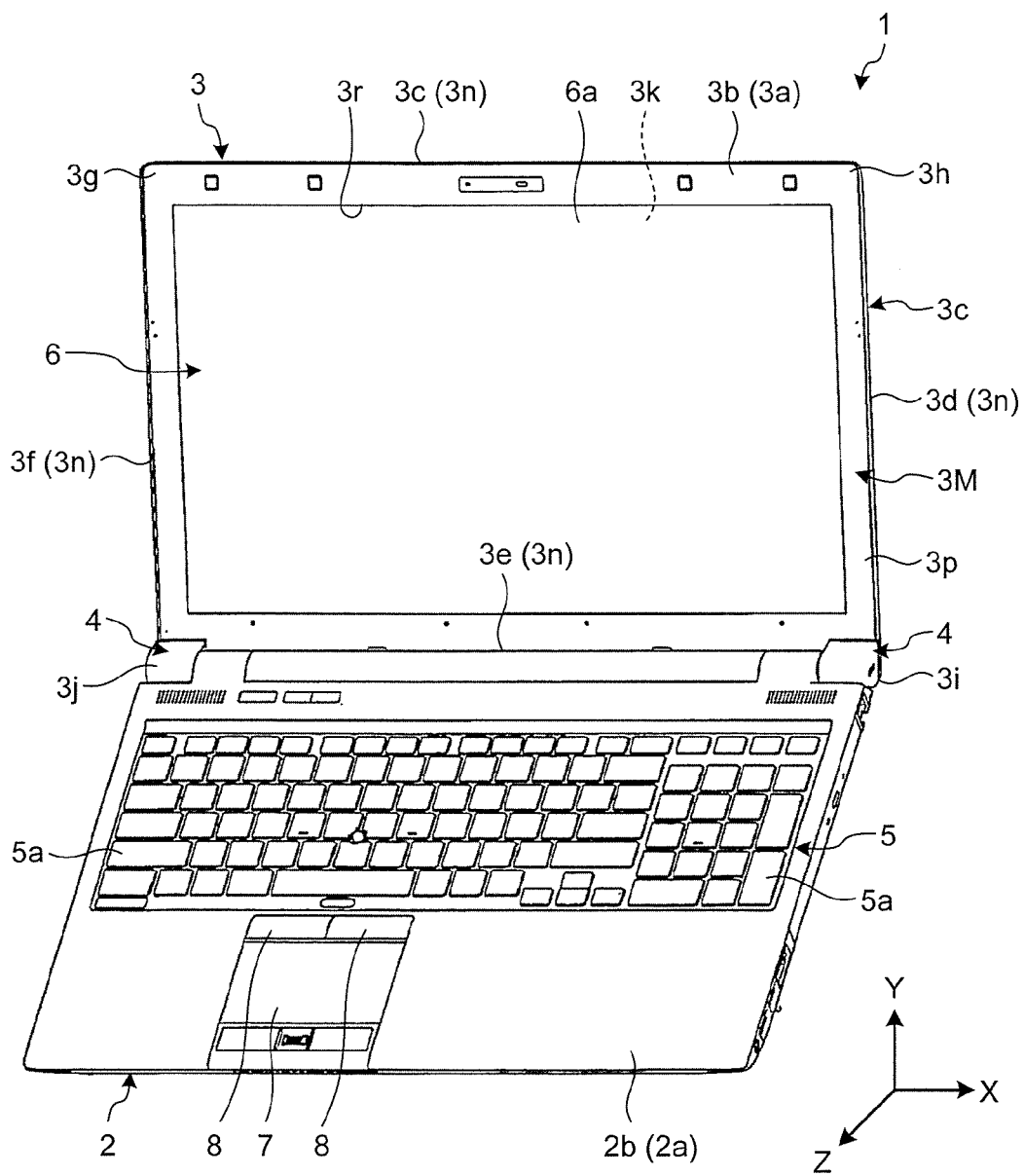
FIG. 1 is an exemplary perspective view of an electronic device according to an embodiment.

As illustrated in FIG. 1, an electronic device 1 of an embodiment is, for example, a notebook personal computer (PC). The electronic device 1 comprises a flat rectangular first unit 2 and a flat rectangular second unit 3. The first unit 2 and the second unit 3 are connected by a hinge mechanism 4 to be relatively rotatable between an open position illustrated in FIG. 1 and a closed position (not illustrated). In the embodiment, for the sake of convenience, directions are defined as follows: X direction indicates the width direction (horizontal direction) of the second unit 3 of the electronic device 1; Y direction indicates the direction of an end of the second unit 3; and Z direction indicates the thickness direction of the second unit 3. The X, Y, and Z directions are perpendicular to one another.

The first unit 2 is provided with a keyboard 5, a pointing device 7, click buttons 8, and the like as input devices, which are exposed on a front surface 2b as the outer surface of a housing 2a of the first unit 2. The second unit 3 is provided with a display panel 6 such as a liquid crystal display (LCD) panel as a display module (display device). The display panel 6 comprises a display screen 6a which is exposed on a front surface 3b as the outer surface of a housing 3a of the second unit 3. In the open position, the keyboard 5, the display panel 6, and the like are exposed so that the user can use them. On the other hand, in the closed position, the front surface 2b closely faces the front surface 3b, and the keyboard 5, the display panel 6, the pointing device 7, the click buttons 8, and the like are hidden between the housings 2a and 3a. In FIG. 1, only keys 5a of the keyboard 5 are indicated.

Figure 2:
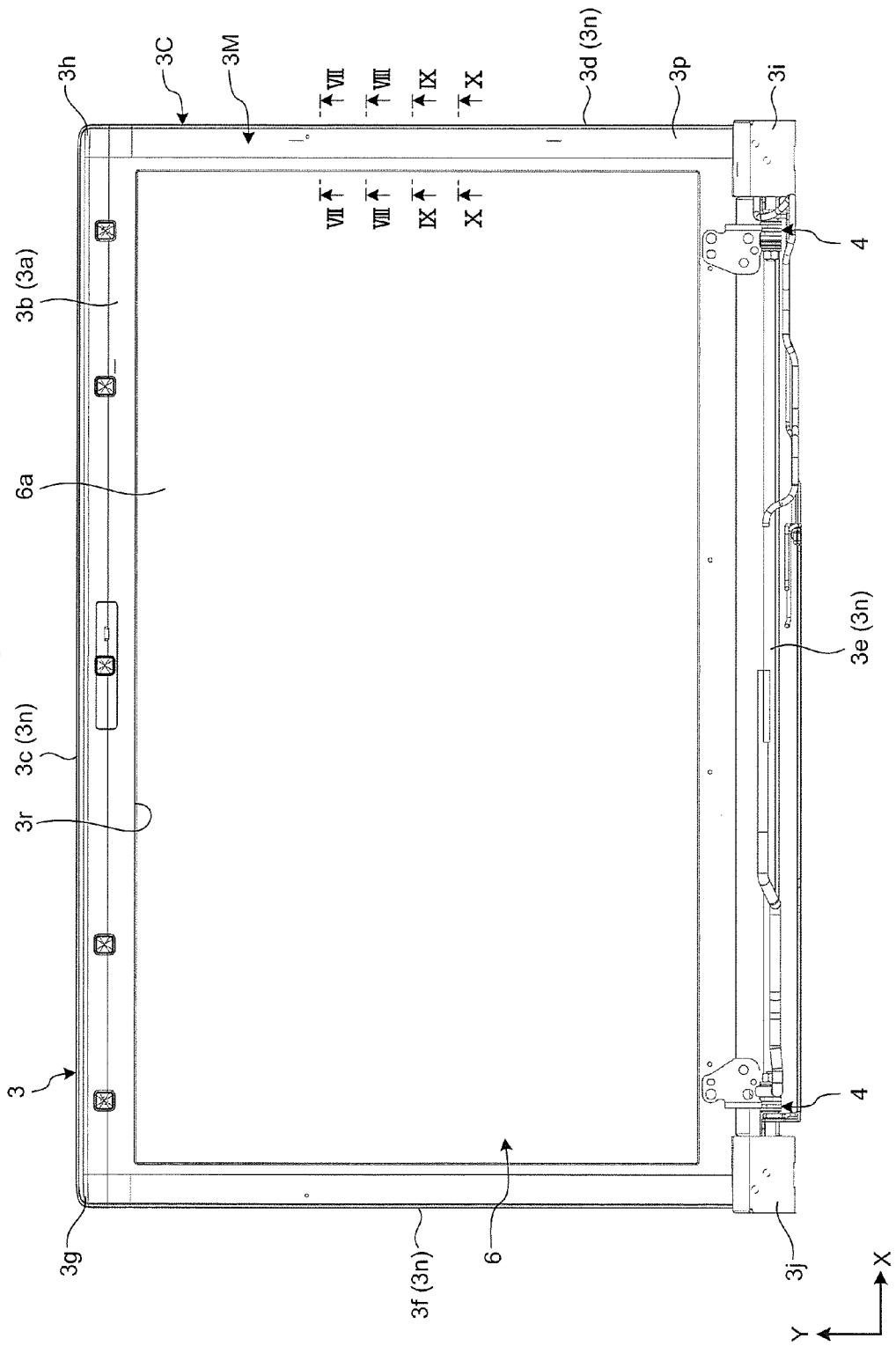
FIG. 2 is an exemplary plan view of a second unit of the electronic device in the embodiment.
Figure 3:
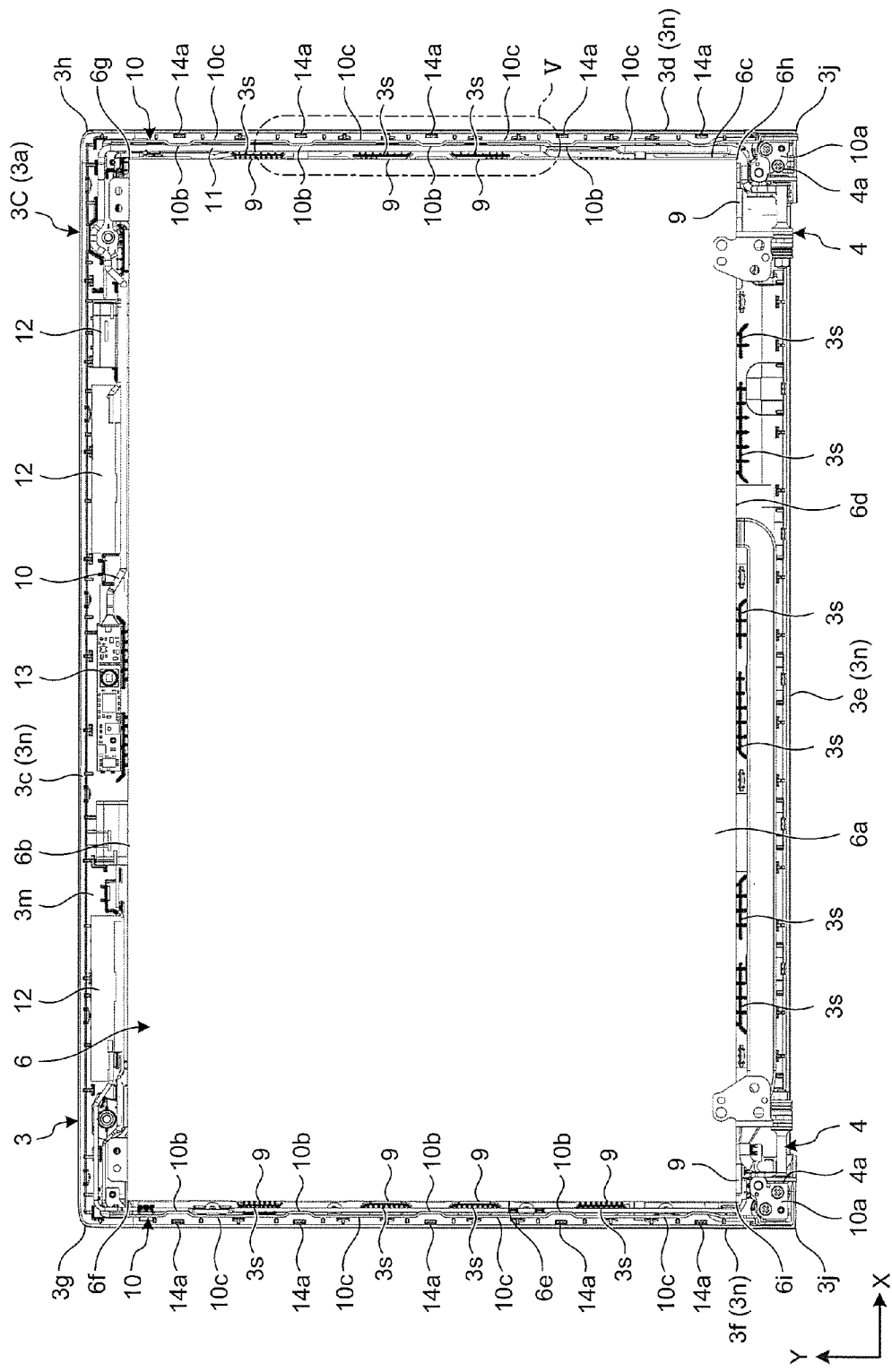
FIG. 3 is an exemplary plan view of the inside of the second unit of the electronic device in the embodiment.

The housing 3a of the second unit 3 comprises a combination of a first component 3C and a second component 3M. FIG. 3 is a plan view of the inside of the second unit 3 from which the second component 3M (see FIG. 1) is removed. As illustrated in FIGS. 1 to 3, the second unit 3 has the shape of a rectangle long in the X direction and short in the Y direction in a plan view from the Z direction. The second unit 3 is thin and flat in the Z direction. The housing 3a of the second unit 3 has four sides 3c to 3f and four corners 3g to 3j. The housing 3a comprises the first component 3C and the second component 3M. The first component 3C has a back wall 3m forming a back surface 3k and a side wall 3n (circumferential wall, standing wall) extending at the periphery of the back wall 3m between the back wall 3m and a front wall 3p. The second component 3M has the front wall 3p forming the front surface 3b. A rectangular opening 3r is formed in the center of the front surface 3b (the front wall 3p) of the second component 3M. The display screen 6a of the display panel 6 is exposed from the opening 3r. In the embodiment, the side wall 3n of the first component 3C provides the sides 3c to 3f and the corners 3g to 3j. Besides, walls such as the back wall 3m, the front wall 3p, and the side wall 3n define the outline of the housing 3a of the second unit 3. In the embodiment, the back wall 3m is an example of a first wall that is located opposite the display screen 6a and extends along a direction crossing a direction (the Z direction) perpendicular to the display screen 6a. Meanwhile, the front wall 3p is an example of a second wall that is located opposite the back wall 3m with respect to the display panel 6 and extends along a direction crossing a direction perpendicular to the display screen 6a. The housing 3a may be made of a metal material, a synthetic resin material, and the like.

As illustrated in FIG. 3, the display panel 6 has the shape of a rectangle long in the X direction and short in the Y direction in a plan view from the Z direction. The display panel 6 is thin and flat in the Z direction. The display panel 6 has four sides 6b to 6e and four corners 6f to 6i. The display panel 6 is located substantially in the center of the first component 3C.

The display panel 6 of the embodiment is not fixed to the housing 3a by a fastener such as a screw or the like but displaceably supported via elastic members 9. More specifically, in the X direction, the display panel 6 is supported as being sandwiched between a plurality of wall-like ribs as protrusions 3s provided to any of the walls of the housing 3a (in the embodiment, for example, the back wall 3m) via the elastic members 9 made of sponge, rubber, or the like. In the Y direction, the display panel 6 is supported as being sandwiched between a plurality of wall-like ribs as the protrusions 3s provided to any of the walls of the housing 3a (in the embodiment, for example, the back wall 3m) via the elastic members 9 made of sponge, rubber, or the like. In the Z direction, the display panel 6 is supported as being sandwiched between some of the walls of the housing 3a (in the embodiment, for example, the front wall 3p and the back wall 3m) via elastic members made of sponge, rubber, or the like (not illustrated). To prevent vibration, noise, and the like in the normal use state, the display panel 6 is relatively firmly supported by the housing 3a. With respect to all the X, Y, and Z directions, the elastic members 9 may be arranged on one or both sides of the display panel 6 in each direction. The protrusions 3s are an example of a supporting member to support the display panel 6.

Figure 4:
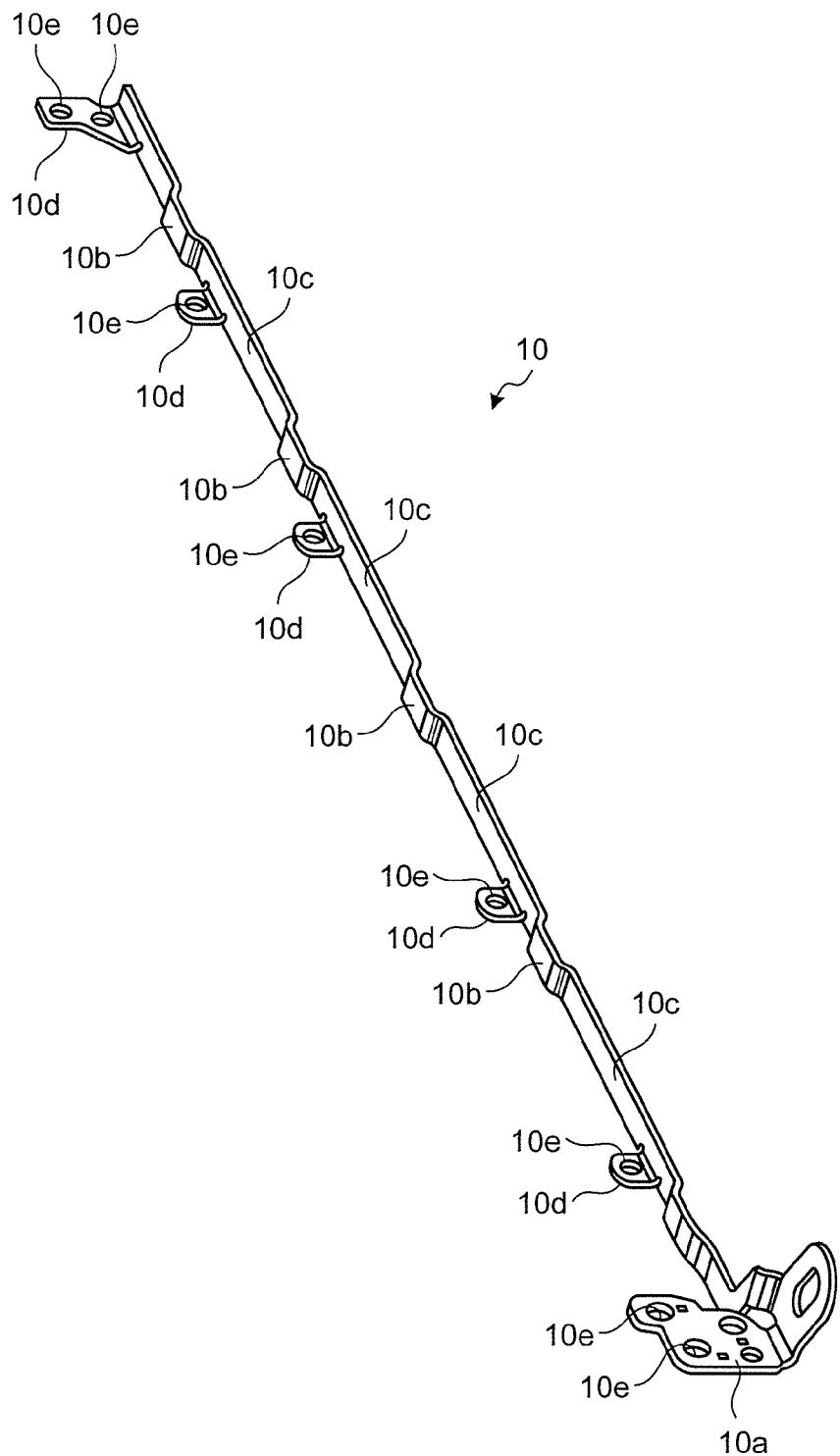
FIG. 4 is an exemplary perspective view of a reinforcing member in the housing of the second unit of the electronic device in the embodiment.

Provided in the housing 3a is reinforcing members 10 that reinforces the housing 3a. In the embodiment, the reinforcing members 10 are located along the Y direction between the side 6c as part of the periphery of the display panel 6 and the side 3d of the housing 3a and between the side 6e as part of the periphery of the display panel 6 and the side 3f of the housing 3a, respectively. The reinforcing members 10 extend over between the side 3e of the housing 3a on the hinge mechanism 4 side and the opposite side 3c. As illustrated in FIG. 4, the reinforcing member 10 is a belt-like plate and has convexes and concaves in the thickness direction. The convexes and concaves increase the flexural rigidity and the torsional rigidity. The reinforcing member 10 may be made by, for example, pressing metal such as stainless steel. That is, the reinforcing member 10 can be referred to as a metal member or plate. The reinforcing member 10 comprises a base 10a that is connected to a base 4a of the hinge mechanism 4 on the side 3c of the housing 3a side. Although FIG. 4 illustrates only the right reinforcing member 10 in FIGS. 2 and 3, the left reinforcing member 10 is of basically the same structure as the right one and the description will not be repeated.

In the housing 3a, a plurality of wirings 11 are routed along the sides 6b, 6c, and 6e as the periphery of the display panel 6. In the embodiment, each of the wirings 11 is located between the display panel 6 and the reinforcing member 10. The wirings 11 are used for, for example, antennas 12 and a camera 13.

With reference to FIGS. 5 to 10, the internal structure of the housing 3a of the second unit 3 will be described in detail below. Incidentally, FIGS. 7 to 10 are cross-sectional views of parts illustrated in FIG. 2 and, for the sake of convenience, the cross-sectional parts of FIGS. 7 to 10 are indicated also in FIGS. 5 and 6. Although FIGS. 5 to 10 illustrate only the right structure in FIGS. 2 and 3, the left structure is of basically the same as the right one and the description will not be repeated.

Figure 5:
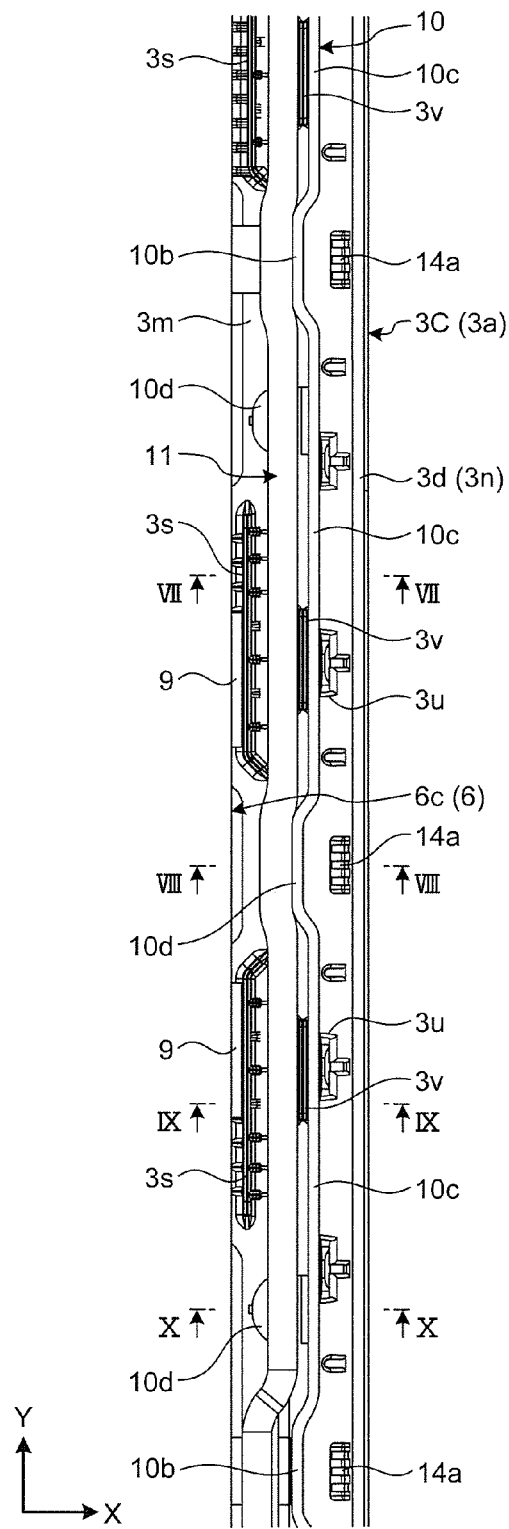
FIG. 5 is an exemplary enlarged plan view of a portion indicated by V in FIG. 3 in the embodiment.
Figure 6:
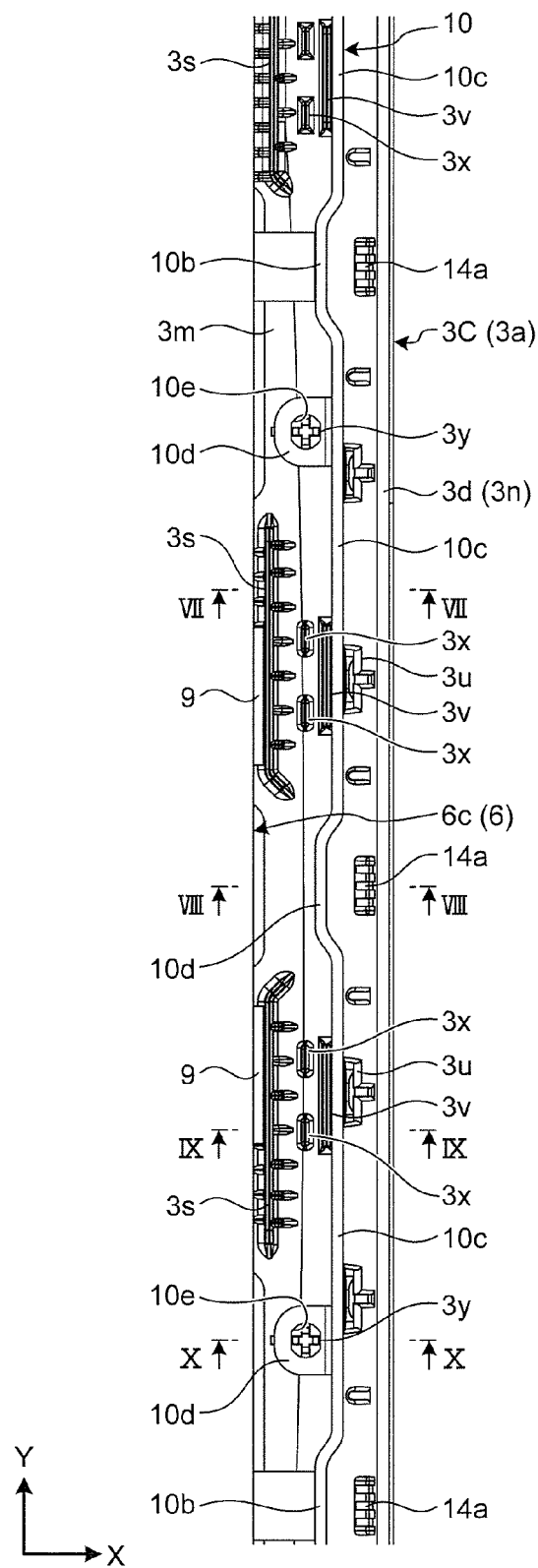
FIG. 6 is an exemplary view of FIG. 4 without wiring in the embodiment.
Figure 7:
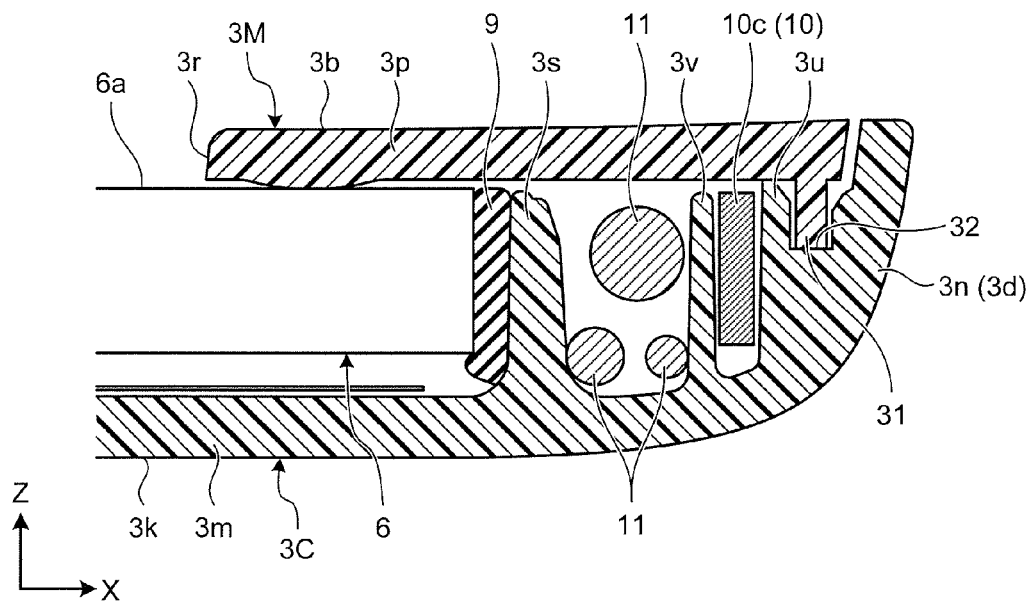
FIG. 7 is an exemplary cross-sectional view taken along line VII-VII of FIG. 2 in the embodiment.

As illustrated in FIGS. 5 to 7, at the periphery of the first component 3C, a plurality of wall-like protrusions 3u are arranged spaced apart along the side wall 3n (the side 3d). Further, protrusions 3v are arranged spaced apart on the inner side of the housing, i.e., the display panel 6 side, with respect to the protrusions 3u, respectively. As illustrated in FIG. 7, The protrusions 3u and 3v protrude from the back wall 3m or the side wall 3n of the first component 3C. The reinforcing member 10 is located between the protrusions 3u and 3v. That is, the protrusions 3u and 3v serves as a support of the reinforcing member 10 and can be a load transmitter between the housing 3a and the reinforcing member 10. The side wall 3n is provided with a recess 32 as an engagement portion having an opening on the second component 3M side at a position opposite the display panel 6 with respect to the protrusion 3u. The second component 3M is provided with a protrusion 31 as an engagement portion that is inserted in the recess 32. With the protrusion 31 and the recess 32, the first component 3C is engaged with the second component 3M in a direction along the display screen 6a (the X direction).

Figure 8:
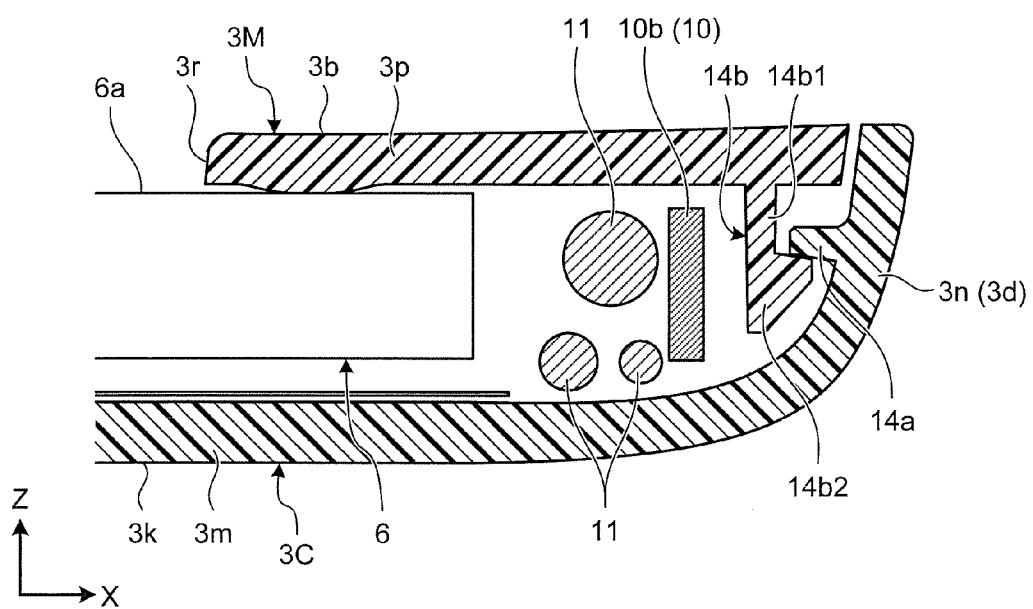
FIG. 8 is an exemplary cross-sectional view taken along line VIII-VIII of FIG. 2 in the embodiment.

Besides, at the periphery of the first component 3C, engagement portions 14a are arranged spaced apart along the side wall 3n (the side 3d). As illustrated in FIG. 8, in the embodiment, the engagement portion 14a is provided as a protrusion protruding from the side wall 3n of the first component 3C toward the inside of the housing, i.e., toward the display panel 6. At the periphery of the second component 3M, engagement portions 14b each engaging with one of the engagement portion 14a are arranged spaced apart along the side 3d at positions corresponding to the engagement portions 14a. The engagement portion 14b comprises a protrusion 14b1 and a claw 14b2. The protrusion 14b1 protrudes from the front wall 3p toward the back wall 3m. The claw 14b2 is at the end of the protrusion 14b1 and protrudes toward the side wall 3n on the back wall 3m side than the engagement portion 14a. The engagement portions 14a and 14b engage with each other in a direction crossing the display screen 6a of the display panel 6 (in the embodiment, for example, a direction perpendicular to the display screen 6a, the Z direction). The engagement of the engagement portions 14a and 14b suppresses the first component 3C and the second component 3M from being separated from each other in the Z direction. One of the engagement portions 14a and 14b is an example of a first engagement portion and the other is an example of a second engagement portion.

During the assembly, when the first component 3C and the second component 3M come close to each other and the engagement portions 14a and 14b engage with each other, the engagement portion 14b climbs over the engagement portion 14a from the inner side of the housing (the display panel 6 side) as being elastically deformed to reach the engagement position illustrated in FIG. 8. As illustrated in FIGS. 5, 6, and 8, in the embodiment, the wirings 11 are arranged on the display panel 6 side than the engagement portions 14a and 14b with respect to the reinforcing member 10 side. Thus, the reinforcing member 10 prevents the engagement portions 14a and 14b from interfering with the wirings 11.

As illustrated in FIGS. 5 and 6, the reinforcing member 10 is bent along the display screen 6a. More specifically, the reinforcing member 10 is partly bent in a convex shape toward the display panel 6 to form parts 10b located on the display panel 6 side with respect to the engagement portions 14a and 14b. The parts 10b are located on the display panel 6 side than parts 10c located opposite the display panel 6 with respect to the protrusions 3s. This structure facilitates to secure a space for the movement of the engagement portion 14b on the display panel 6 side to engage with the engagement portion 14a. In the embodiment, the part 10b is an example of a first portion of the reinforcing member 10, while the part 10c is an example of a second portion of the reinforcing member 10.

As illustrated in FIG. 6, the parts 10b that are portions of the reinforcing member 10 bulged toward the display panel 6 are located more distant from the display panel 6 than the protrusion 3s. With this, if the display panel 6 is displaced in the X direction when the electronic device 1 falls or the like, it is possible to suppresses the reduction of buffering effect by the deformation of the protrusion 3s resulting from that the display panel 6 comes in contact with (the parts 10b of) the reinforcing member 10 before the protrusion 3s.

As illustrated in FIGS. 5, 6, and 8, in the embodiment, the protrusion 3s is not provided to the engagement portions 14a and 14b on the display panel 6 side. That is, in the embodiment, the protrusion 3s and the engagement portions 14a and 14b are located at different positions along the periphery of the display panel 6. In the embodiment, the wirings 11 are routed on the display panel 6 side of the reinforcing member 10. If the protrusion 3s is present on the display panel 6 side of the engagement portions 14a and 14b, the space is reduced between the part 10b that is a portion of the reinforcing member 10 bulged toward the display panel 6 and the protrusion 3s. This causes a difficulty in routing the wirings 11 at the time of the assembly. In addition, the wirings 11 are likely to be caught between the parts 10b and the protrusion 3s getting pushed by the display panel 6 and falling over when the electronic device 1 falls or the like. Regarding this, according to the embodiment, the protrusion 3s is not provided at least on the display panel 6 side of the engagement portions 14a and 14b, and thus the above problems can be avoided.

As illustrated in FIG. 5, the wiring 11 can be located between the parts 10b of the reinforcing member 10 and the protrusions 3s. This structure increases the retention of the wiring 11.

Figure 9:
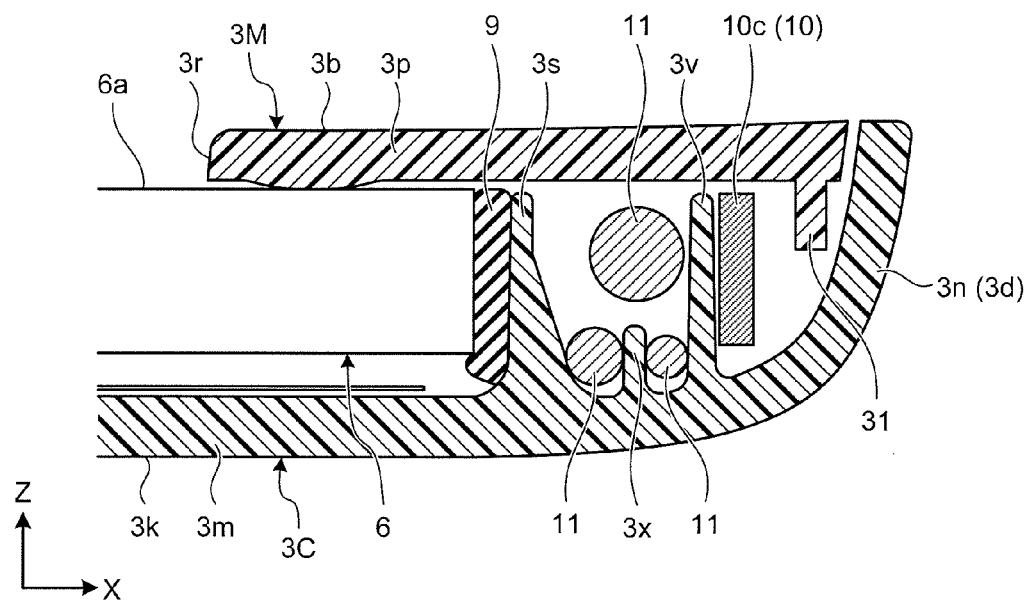
FIG. 9 is an exemplary cross-sectional view taken along line IX-IX of FIG. 2 in the embodiment.

As illustrated in FIGS. 6 and 9, a protrusion 3x shorter than the protrusion 3s is provided between the protrusion 3s and the reinforcing member 10 (the protrusion 3v). With respect to the protrusion 3x, the thin wirings 11 are arranged both the protrusion 3s side and the reinforcing member 10 side, and the thicker wiring 11 is arranged beyond the end of the protrusion 3x. In the case of routing a plurality of wirings, if the wirings overlap in one direction or are twisted, it may be difficult to route the wirings. Regarding this, according to the embodiment, the plurality of wirings 11 are efficiently laid out with the protrusion 3x, which prevents the arrangement of the wirings 11 from becoming difficult. Preferably, the wiring 11 between the protrusions 3s and 3x is sandwiched (fitted) between the protrusions 3s and 3x, and the wiring 11 between the protrusions 3v and 3x is sandwiched (fitted) between the protrusions 3v and 3x. With this, the wirings are less likely to be displaced and can be routed easier at the time of the assembly. Incidentally, the protrusion 3x is an example of a second supporting member.

Figure 10:
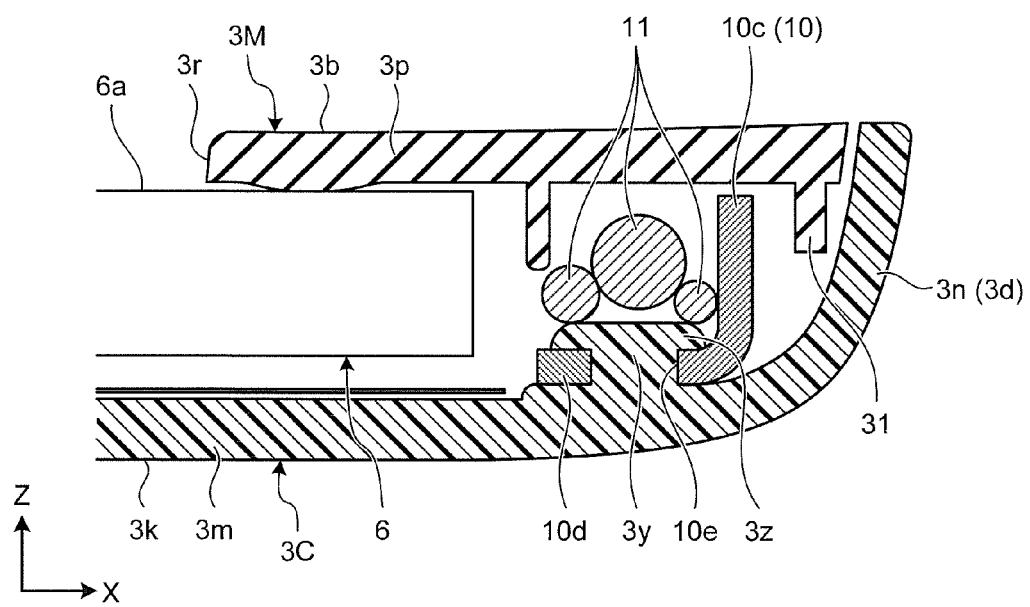
FIG. 10 is an exemplary cross-sectional view taken along line X-X of FIG. 2 in the embodiment.

As illustrated in FIGS. 4, 6, and 10, the reinforcing member 10 has protrusions 10d each extending in an L shape along the back wall 3m. The reinforcing member 10 is bonded to the housing 3a by thermal fusion at the protrusions 10d. More specifically, the protrusion 10d is provided with an opening 10e into which is inserted a protrusion 3y protruding from the back wall 3m. An end 3z of the protrusion 3y passing through the opening 10e is heated from the protruding side and flattened, thereby spreading over around the opening 10e. The protrusion 10d is held between the enlarged end 3z and the back wall 3m, and thereby the reinforcing member 10 is fixed to the first component 3C. Besides, in the embodiment, the protrusions 3s and 10d are located at different positions along the periphery of the display panel 6. Thus, the protrusions 3s and 10d can be efficiently laid out. Incidentally, FIG. 6 illustrates the protrusion 3y before being flattened.

As described above, according to the embodiment, the wirings 11 are located opposite the engagement portions 14a and 14b with respect to the reinforcing member 10. Thus, the reinforcing member 10 prevents the engagement portions 14a and 14b from interfering with the wirings 11. Besides, the wirings 11 are located on the side opposite the display panel 6 with respect to the protrusion 3s. With this, if the display panel 6 is displaced toward the wirings 11 when the electronic device 1 falls or the like, the wirings 11 can be protected by the protrusion 3s. Thus, the protection of the wirings 11 can be improved on both the display panel 6 side and the opposite side.

While the above embodiment is described as being applied to a PC, it may also be applied to other electronic devices. For example, the above embodiment may also be applied to an electronic device having a component such as a display module other than LCD. Further, the internal structure of the housing can be variously modified. The supporting member and the second supporting member may be provided to the wall on the display screen side. The side wall of the housing may be integrated with the wall on the display screen side, and the side wall continuous to the wall on the display screen side and the side wall continuous to the wall on the side opposite the display screen may overlap. Besides, regarding the display screen, the display module, the first wall, the second wall, the first component, the second component, the first engagement portion, the second engagement portion, the periphery, the reinforcing member, the wiring, the supporting member, the second supporting member, the first portion, the second portion, and the like, the specifications (form, structure, location, shape, number, size, thickness, material, etc.) can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display module comprising a display screen;
a first component comprising a first wall located opposite the display screen with respect to the display module and a first engagement portion located in a direction crossing a direction perpendicular to the display screen;
a second component comprising a second wall located opposite the first wall with respect to the display module and a second engagement portion configured to engage with the first engagement portion;
a reinforcing member located between the display module and at least one of the first engagement portion and the second engagement portion, the reinforcing member extending along at least part of a periphery of the display module;
a wiring located between the reinforcing member and the display module; and a supporting member provided to at least one of the first component and the second component and located between the display module and the wiring, the supporting member configured to support the display module.

2. The electronic device of claim 1, wherein the supporting member, the first engagement portion, and the second engagement portion are arranged along the periphery of the display module at different positions.

3. The electronic device of claim 2, wherein a first portion of the reinforcing member located on a side of the display module with respect to the first engagement portion and the second engagement portion is closer to the display module than a second portion of the reinforcing member located opposite the display module with respect to the supporting member.

4. The electronic device of claim 3, wherein either the first engagement portion or the second engagement portion comprises a portion closer to the display module than either the second engagement portion or the first engagement portion.

5. The electronic device of claim 3, wherein the first portion is located more distant from the periphery of the display module than the supporting member.

6. The electronic device of claim 1, wherein one of the first component or the second component that comprises the supporting member is provided with a second supporting member located between the supporting member and the reinforcing member to support the wiring.

7. The electronic device of claim 6, wherein the wiring is arranged on a side of the supporting member and on a side of the reinforcing member with respect to the second supporting member.

8. The electronic device of claim 7, wherein
the second supporting member protrudes less than the supporting member, and
the wiring is located beyond an end of the second supporting member.

9. An electronic device comprising:
a display device comprising a display screen;
a first component comprising a first wall located opposite the display screen;
a second component comprising a second wall located opposite the first wall;
an engagement portion provided to either the first component or the second component to engage with either the second component or the first component;
a reinforcing member located between the display device and the engagement portion, the reinforcing member extending along at least part of a periphery of the display device;
a wiring located between the reinforcing member and the display device; and
a supporting member provided to at least one of the first component and the second component and located between the display device and the wiring, the supporting member configured to support the display module.

* * * * *